INVENTORS
Thomas Coor
Stuart L. Ridgway

United States Patent Office 3,522,739
Patented Aug. 4, 1970

---

3,522,739
SPECTROPHOTOMETER APPARATUS UTILIZING
A RATIO MEASURING CIRCUIT
Thomas Coor and Stuart L. Ridgway, Princeton, N.J., assignors to Princeton Applied Research Corporation,
Princeton, N.J.
Filed Oct. 28, 1968, Ser. No. 771,039
Int. Cl. G01j 3/42, 3/46
U.S. Cl. 356—97
11 Claims

ABSTRACT OF THE DISCLOSURE

A direct reading spectrophotometer is provided wherein an illuminating means is utilized to apply two discrete radiation wavelengths to a fiber optic bundle in a time division multiplex sequence. The reflected light, which remains multiplexed, is then detected and transduced into electrical signals. These electrical signals are then separated by a switch which is connected to a light detector via a variable amplitude control means. The separated signal representing the denominator of the desired ratio of the two signals is then compared to a reference voltage and thereafter fed back to control the amplitude of the signals passed by the variable amplitude control means. Thus, the desired ratio may be read directly by sensing the second of the separated signals.

---

This invention relates to testing and measuring devices and more particularly to a novel spectrophotometer which, inter alia, may be utilized as an oximeter to directly record or measure the oxygen content of the blood.

Although the application of this invention is not limited to any particular field of endeavor or any particular use therein, it will immediately become apparent that the instant invention has a wide range of utilization within the biological sciences as an instrument for continuously monitoring the oxygen saturation of the blood.

The medical profession has, for a long time, found it necessary to measure the oxygen saturation of the blood for proper diagnoses of many circulatory and resipratory ailments as well as to establish the presence of cardiac shunts. These measurements were originally conducted by utilizing blood sample extraction techniques. However, such extraction techniques proved to be objectionable due to patient discomfort, the prolonged and time consuming analysis which they required, and the realization that the withdrawal of a mulitude of samples often resulted in a significant blood loss. With the advent of fiber optics it became possible to measure the oxygen content of the blood without any extraction of samples, thereby eliminating the significant blood losses and a large part of the patient's discomfort. Fiber optic technique also provided desirable because continuous sampling was possible thereby permitting a true monitoring of the oxygen saturation of the blood rather than the random inspection which did not provide timely warnings as to sudden changes in oxygen saturation which might require immediate action.

The fiber optic oximeter systems presently available make use of the physical principle that the blood will selectively reflect different wavelength radiation incident thereon such that the ratio of intensities thereof is a function of the oxygen saturation of the blood. Such systems have, however, certain disadvantages which have prevented their wide acceptance. The principal disadvantages of these devices are that they do not directly read the percent of oxygen saturation but merely present, either during separate time intervals or by separate designation, the respective intensities of each different wavelength reflected; and that the optical systems in such prior art devices are highly complex, hence subject to inaccuracies in use, and require a plurality of photosensitive devices, precision wavelength filters, and mechanical radiation adjusting expedients which cause the prior art devices to be expensive, difficult to operate and calibrate, and generally provide imprecise results.

Therefore, it is an object of the present invention to provide a novel spectrophotometer, usable as a direct reading oximeter, which provides a direct indication of the percent of oxygen saturation present in a fluid such as blood, and whose structure is uniquely designed to insure simplicity in operation, economy of the elements utilized, and extremely precise results. Various other objects and advantages of the invention will become clear from the following detailed description of an embodiment thereof, and the novel features will be particularly pointed out in connection with the happended claims.

In accordance with the invention, a direct reading spectrophotometer is provided in which a direct indicatio nof the percent of oxygen saturation present in a fluid is directly indication of the percent of oxygen saturation present in a fluid is directly indicated and structure is provided therefor to insure operational simplicity, precise results, and economical construction. The invention will be more clearly understood that by reference to the following detialed description of an embodiment thereof in conjunction with the accompanying drawings in which.

Figure 1:
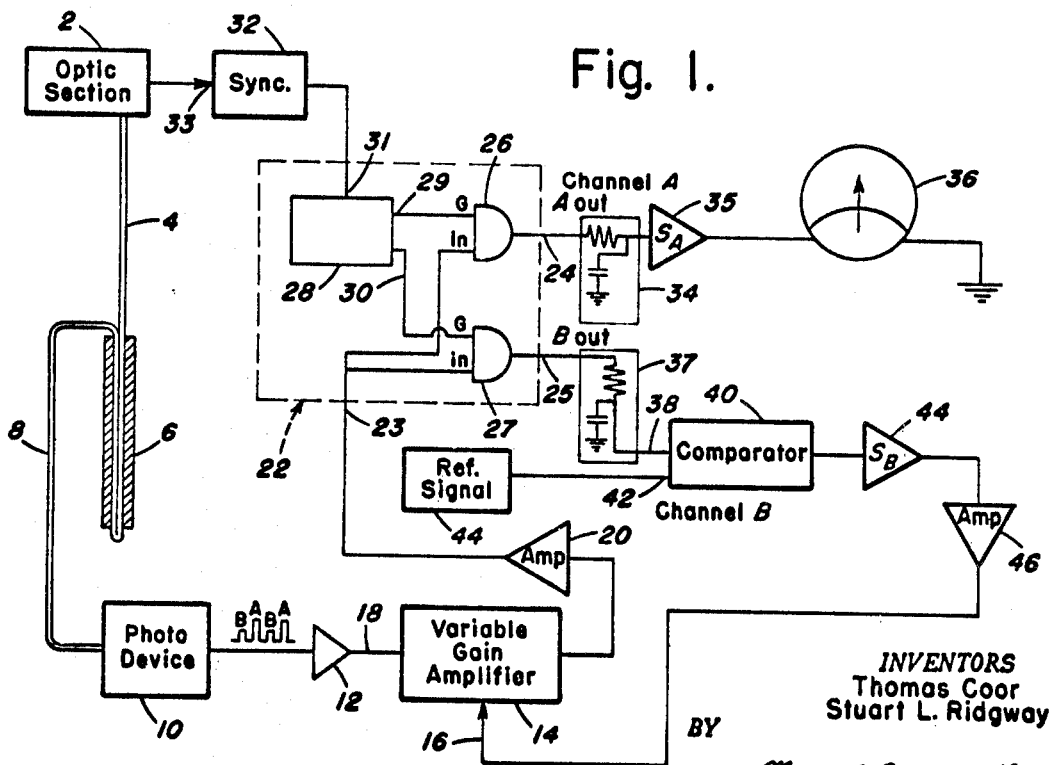
FIG. 1 is a plan view of the overall spectrophotometer system.

Referring now to the drawings and more particularly to FIG. 1 thereof, there is shown a block diagram of an embodiment of a spectrophotometer according to the present invention. The spectrophotometer includes an optic section 2, shown in detail in FIG. 2, which is connected to the light input branch 4 of a catheter 6. The function of the optic section 2, as will be shown hereinafter, is to apply light radiations at two discrete wavelengths to the light conducting channel of the catheter 6 in a time division multiplex sequence. The catcheter 6, which forms no part of this invention per se, may be of the intracardiac or intravascular variety and may comprise either separate afferent and efferent fiber optic bundles or a single fiber optic bundle which transmits light in both directions. Additionally, the catheter 6 may include a coating or other means, whereby its insertion may be followed by X-ray or fluoroscope, and a shield may be affixed to the distal end thereof to prevent the fiber bundle(s) from touching organ walls.

The light output branch 8 of the catheter 6 is connected to a photoresponsive device 10 shown as a photo diode but which may be any one of several of the class of devices commonly known electro-optical transducers. The photoresponsive device 10 is connected to an amplifier 12 which in turn is connected to a variable gain amplifier 14. Thus, the multiplexed sequence of the two discrete light wavelengths is transduced by the photoresponsive device 10 into electrical signals in the same time division multiplex sequence, as indicated by pulses marked A and B, which sequence is amplified and applied to the variable gain amplifier 14. The variable gain amplifier 14 in response to control signals applied to the control terminal 16 amplifies signals present at its input terminal 18 to a degree determined by the magnitude of the control signal present at the control terminal 16. A potentiometer and servo motor combination could be substituted for the variable gain amplifier shown, but such a substiution would also sacrifice the speed of operation. The output of the variable gain amplifier 14 is then applied to the amplifier 20 whose output is in turn connected to switch 22.

The function of the switch 22, which is generally indicated by the dashed block, is to separate and distribute the respective information pulses A and B in the multiplex sequence applied at its input terminal 23, to the respective A and B output channels connected to switch output terminals 24 and 25, respectively. Thus, the switch 22 can comprise two channel gates 26 and 27, which can be gated switching devices or any one of the well known class of linear gates which will pass a signal applied to their IN input terminals when their gate terminals G are energized; and a distributor 28, which may be a flip-flop or a two-stage ring counter, that acts to sequentially energize its respective outputs 29 and 30 in response to a clocking signal applied to its input 31. The distributor 28 is synchronously timed by the timing circuit 32 which can be a clock pulse generator or a slave oscillator.

The timing circuit 32 is synchronized so as to be in the proper time relationship with each of the discrete wavelength radiations produced by the optic section 2 by the connection of its input 33 directly to the optic section 2. The switch 22 therefore acts as a detector for separating the multiplex information received at its input terminal 23, and for distributing the same to the A and B channels connected to its respective output terminals 24 and 25.

The signals present at output terminal 24 are thereafter applied to the A channel, which channel includes a smoothing filter means 34 which may comprise the R-C combination shown and an amplifying stage 35. The A channel terminates in a meter 36 which may be a recording meter or any other general indicating device used in the electrical arts. The signal present at output terminal 25 is initially applied to a second smoothing filter means 37 which again take the form of the R-C combination shown and thereafter to a first input 38 of the comparator device 40 present in the B channel. A reference signal, which is preferably of unity value, is generated by a reference signal source 44 and is applied to the second input 42 of the comparator device 40.

The comparator device 40, which may be a standard difference amplifier, effectively acts to algebraically subtract the signals present at terminals 38 and 42 and produce a difference signal which is applied, via amplifiers 44 and 46, to the control terminal 16 of the variable gain amplifier to control the gain thereof.

Figure 2:
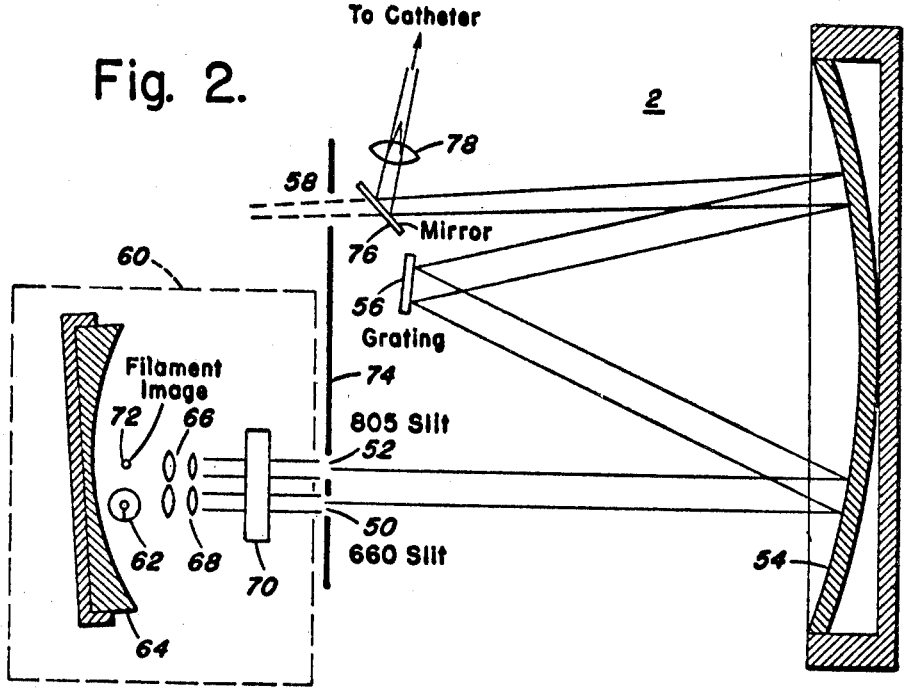
FIG. 2 is a detailed view, partially in section, of the optic section of the FIG. 1 spectrophotometer.

The function of the optic section 2, as stated above, is to apply light radiation at two discrete wavelengths to the light conducting channel of the catheter 6, in a time division multiplex sequence. The optic section, which is the subject matter of application Ser. No. 770,954, filed on the same date as the instant application, is shown in detailed in FIG. 2. The optical section 2, as shown in FIG. 2, comprises two input slits 50 and 52, a concave mirror 54, a diffraction grating 56, and an exit slit 58. The input slits 50 and 52 are alternately illuminated with white light whose angular distribution is sufficient to fill the aperture of the spectrometer by the apparatus enclosed within the dashed lines 60.

The apparatus enclosed within block 60 comprises a white light source 62, which may be a tungsten filament lamp, having an appropriate intensity filament therein whose end view is shown; a concave reflecting mirror 64; collimating lens sets 66 and 68; and a chopper 70, which may be a ten slot rotatable disc. The concave mirror 64 forms a real image of the filament of source 62 at a location 72, which location has the same spatial relationship with the lens set 66 and the input slit 52 that the source 62 has with the lens set 68 and the input slit 50. Thus, each collimating lens set is provided with virtually the same, identical source, i.e., the source for each set is positioned relative thereto at the identical spatial location, and is of virtually the same intensity.

As a property of the instant spectrometer is to image the entrance slit into the exit slit for the particular wavelength(s) of light that the instrument is designed to pass and the exit is defined as a fiber optic bundle having an inherent granular structure, the direct imaging of the light source 62 into the entrance slits and subsequently to the output slit would cause some fibers in the fiber optic bundle to be brightly lit while others would be dimly lit. Further, small mechanical displacements of the exit fiber optic bundles, or replacements thereof would cause undesirable changes in the transmitted monochromatic intensity. To avoid such undesirable features, collimating lens sets 66 and 68 are placed close to each slit and the focal point of each lens set 66 or 68 is placed at its respective light source 72 or 62. This arrangement has the desirable effect of transforming the inhomogeneity in the spatial distribution of the light source into an inhomogeneity in the angular distribution of the same whereby the overall light transmission will not be susceptible to small displacements of the fiber optic bundle as the fiber optic bundle's angular light acceptance is smooth not granular. Thus, this arrangement causes the intensity of the radiation impingement on the entrance and exit slits 50, 52 and 58 to be uniform, and does not penalize the luminosity of the system by more than the reflective losses of the collimating lens sents 66 and 68 which losses can be made very small by suitable non-reflective coatings. The diameter of the collimating lens sets 66 and 68 must be greater than the largest dimension of the entrance slit, and the angular extent of each of the sources 62 and 72, as seen from the center of each of the collimating lens sets 68 and 66, respectively, should be at least as large as the angular acceptance aperture of the spectrometer. If these two conditions are met, the output brightness will be as great as if the filamentary light source and the entrance slit coincided.

The chopper 70, when rotating, acts to alternately illuminate each slit with the impingent radiation described above. Thus, multiplexed light having approximately a one millisecond spacing between information pulses, as will be hereinafter described, is presented to the exit slit 58.

The white light radiation alternately impingent on each of the input slits 50 and 52 is incident on the concave mirror 54 and is reflected therefrom so as to impinge on the diffraction grating 56. The white light radiation which impinges upon the diffraction grating 56 is diffracted thereby and the thus separated components impinge on the mirror 54. The second reflection from the mirror 54 greatly compensates, in the well-known manner, the aberrations introduced by the first reflection therefrom, and causes the previously selected component wavelengths to radiate toward the exit slit 58. It should be noetd that in the FIG. 2 drawing, the light rays shown leaving the diffraction grating 56 are representative of only the selected components, however it is obvious that all other components from the diffracted white light radiations will impinge on mirror 54, but they will not be reflected therefrom in a path calculated to impinge upon the exit slit 58.

The wavelengths of the selected white light components which, upon the second reflection from the concave mirror 54, radiate toward the exit slit 58 are determined, once the relationship between the exit slit 58, the mirror 54 and the diffraction grating 56 are fixed, by the positioning and the separation between the input slits 50 and 52. The precise positioning of the input slits may be determined by making use of the well known physical law that every optical path is readily reversible. Thus, light at the first and second selected wavelengths may be separately utilized to illuminate the exit slit 58 and the position where each respective wavelength impinges upon plate 74 is the position for locating that respective input slit. In the case where the standard oximeter wavelengths of 805 m$\mu$ and 660 m$\mu$ were utilized, the separation between the input slits was found to be approximately 0.3 inch.

Since the effective aperture size of the optical system is approximately $f4$, and the cone of radiation usable by standard fiber optic catheters is $f1.6$, an adapter is necessary to properly utilize the radiation impinging on the exit slit 58. Accordingly, a plane mirror 76, which is shown disproportionately large in order to assist the instant description, is placed over the exit slit and at an angle with respect thereto so that the light impingent thereon is reflected toward the reduction lens 78. The radiation is properly reduced by said reduction lens 78 and is thereafter applied to the light input branch 4 of the catheter 6.

The operation of the above described apparatus will be explained in conjunction with the disclosed oximeter embodiment; however, it will be obvious that general spectrophotometer uses will be based upon the same principles of operation. As normally done by those skilled in the oximeter arts, it is assumed that hemoglobin, which is the respiratory pigment in the red corpuscles which combines loosely with oxygen, exists in the blood only as oxyhemoglobin and reduced hemoglobin. Therefore, as is well known in the art, if radiation of a first wavelength, which wavelength is equally absorbed by both oxyhemoglobin and the reduced hemoglobin, is impinged upon the blood, the intensity of the light reflected therefrom will be a reciprocal function of the total hemoglobin present. In similar manner, if radiation of a second wavelength, which wavelength is unequally absorbed by the oxyhemoglobin and the reduced hemoglobin, is impinged upon the blood, the intensity of the light reflected therefrom will be a reciprocal function of the oxyhemoglobin present in the blood. Thus the ratio of the intensities of light reflected from the blood at two such wavelengths will be a function of the percent of oxygen saturation of the blood since the ratio of the first wavelength over said second wavelength is in effect a function of the oxyhemoglobin over the total hemoglobin. If the light absorbed by oxyhemoglobin (100% $O_2$ saturation) and that absorbed by reduced hemoglobin (0% $O_2$ saturation) is ploted against the various wavelengths present in white light, as the abscissa, there will be a plurality of specific wavelengths at which the two curves intersect. These points of intersection have been denominated isobestic points and any specific wavelengths which yields such a point on the aforementioned plot is suitable for use as the first wavelength. However, such wavelength need not of necessity be used since all that is necessary is that the first wavelength have a substantially different rate of absorbtion with regard to oxyhemoglobin than the second selected wavelength. The second wavelength may be selected at either a higher or lower wavelength than that yielding the isobestic point; however, the second wavelength should be sufficiently above or below said first wavelength so that the difference in the amount of light absorbed is quite substantial. The following operation will be described wherein the first wavelength is selected at 805 m$\mu$ and the second wavelength is 660 m$\mu$; however, it should be apparent that other selected wavelengths are fully applicable to the present embodiment.

The optic section shown in detail in FIG. 2 is adjusted, in the manner described above, so that white light impingent on slt 50 will produce a radiation component of 660 m$\mu$ at the output slit 58, and so that white light impingent on slit 52 will produce a radiation component of 805 m$\mu$ at the output slit 58. When the circuitry of FIG. 1 is energized, the mirror 64 will form a real image of the filament of the tungsten lamp 62 at the position 72. The collimating lens sets 66 and 68, acting in the previously described manner, will transmit this radiation to the input slits 52 and 50 respectively when the chopper 70 is in the proper relationship therewith. The chopper 70, as previously stated, may be a ten slot disc and is preferably rotated at an angular speed which is sufficiently high to maintain relatively short pulse durations and time separation between the pulses of radiation which are thereafter transduced into electrical signals, to thereby reduce noise and cross-talk to a minimum. Thus, the apparatus enclosed within the block 60 in FIG. 2 will alternately illuminate input slits 50 and 52 with white light radiation of equal intensity and having, as previously mentioned, the requisite angular distribution so that each slit, when illuminated, is illuminated uniformly across its entire area.

The radiation alternately impinging on the input slits 50 and 52, as shown by the radiation paths illustrated in FIG. 2, is incident on the concave mirror 54 and reflected therefrom onto the diffraction grating 56. The which light radiation alternately radiating from input slits 50 and 52, and thus alternately impinging on the diffraction grating 56, is thereby separated into its spectral components which components diffract from the diffraction grating 56 onto the concave mirror 54. As previously stated, only the 805 m$\mu$ and 660 m$\mu$ components of interest are shown radiating from the diffraction grating 56 to the concave mirror 54, and from the mirror 54 toward the exit slit 58. The second reflection of the light radiation from the mirror 54 reduces optical aberrations introduced into the radiation by the first reflection from the concave mirror 54 and thus no further aberration corrections are necessary in the optical section of the disclosed embodiment of the instant spectrophotometer. The 805 m$\mu$ and the 660 m$\mu$ components are thus alternately reflected from the concave mirror 54 and radiate toward the exit slit 58. These components then reflect from the plain mirror 76 and impinge on the reduction lens 78 which, as explained above, adapts radiation passing therethrough for use with an F1.6 optic fiber bundle. Therefore, it is seen that the optic section 2 of the present embodiment of the disclosed invention applies radiation having two discrete wavelengths to the input branch 4 of the catheter 6 in a time division multiplex sequence.

Returning now to FIG. 1, it is seen that the 805 m$\mu$ and the 660 m$\mu$ radiation applied in a time multiplex sequence to the input branch 4 of the catheter 6, which has previously been surgically placed in the desired location, propagates through the fiber optic bundle(s) enclosed therein to impinge upon the blood present at the distal end thereof. The radiation at each particular wavelength is selectively absorbed or scattered and hence a portion of the scattered radiation propagates back through the fiber optic bundle(s) present in the catheter 6 to the output branch 8 thereof. The scattered radiation present in the output branch 8 of the catheter 6 remains in the same time multiplex sequence as was initially applied to the catheter since no significant time delays are introduced during the scattering/absorption process. Thus, the scattered light present in the output branch 8 of the catheter 6 is applied thereby to photoresponsive circuit 10.

The photoresponsive circuit 10 may, as previously stated, include a photo diode or any other photoresponsive device; however, it need not, of necessity, include a photomultiplier tube. The photoresponsive circuit 10 acts to transduce the radiation impingent thereon in a time multiplex sequence into electrical signals, as indicated by the B-A pulse train shown at the output thereof, in the same time multiplex sequence. These signals are then applied to the amplifier 12 and thereafter to the input 18 of the variable gain amplifier 14. The variable gain amplifier 14, as previously stated, selectively amplifies signals present at its input 18 to a degree determined by the signals present at its control terminal 16. The thus variably amplified time multiplex signal sequence is then applied to the switch 22 via the additional amplifier 20.

The time multiplex signal sequence present at input 23 of switch 22, is applied in parallel to the input terminals designated IN of both channel gates 26 and 27 included in the switch 22. The channel gates 26 and 27, as previously explained, will pass signals present at their input terminals designated IN when their gate electrodes G are energized. The gate electrodes G of the channel gates 26 and 27 are each connected to one of the separate output terminals 29 or 30 of the distributor 28, which may be a ring counter or a flip-flop. Thus, the gate electrodes G and hence the channel gates 26 and 27 are selectively and alternately energized depending upon the state of the distributor 28. The distributor 28 selectively and alternately energizes its output terminals 29 and 30 in response to the clocking signal applied to its input terminal 31. The clocking signal applied to input 31 of the distributor 28 is applied by the timing circuit 32 which may be a clock pulse generator or a slave oscillator. The timing circuit 32 is synchronized to be in the correct time relationship with each of the separate wavelength pulses by the connection of its input terminals 33 directly to the optic section 2. This connection of the input terminal 33 to the optic section 2 may be accomplished by the utilization of a separate photoresponsive means therefor or by connection to the disc rotating means. Thus, the properly synchronized timing circuit 32 applies the clocking signals to terminal 31 to selectively and alternately change the state of the distributor 28. The thus controlled distributor 28, selectively and alternately energizes the gate electrodes G and thereby the channel gates 26 and 27 so that the channel gates 26 and 27 are in frame with the multiplex signal sequence present at their input terminals IN. When the channel gates 26 and 27 are thus in proper frame, they are respectively enabled to thereby separate the incoming multiplex signal sequence so that A pulses are applied via channel gate 26 to the A channel and B pulses are applied via channel gate 27 to the B channel. Thus, switch 22 acts as a detector to separate the A and B signals applied thereto in a time division multiplex sequence and apply the signals separated thereby to their respective channels.

The separated B signals applied to the B channel are the electronic representation of the 660 m$\mu$ wavelength radiation applied to the catheter 6, which radiation is thereby unequally absorbed by the oxyhemoglobin and the reduced hemoglobin. Thus, the B signals present in the B channel represent the denominator of the desired ratio. The B signals are applied to input 38 of the comparator device 40 after the suitable smoothing thereof by the filter means 37. The comparator device 40 which may be a difference amplifier has an additional input 42 to which a reference signal source 44 is connected. The reference signal source 44 applies a reference signal which is preferably of a unity value to the comparator 40. The output of the comparator represents the difference between the B signals applied at input terminal 38 and the reference signal applied at input terminal 42 and, in the preferred case, represents the difference between the B signal and unity. The difference signal is amplified by the channel B amplifier 44 and the amplifier 46, and is thereafter applied to the control terminal 16 of the variable gain amplifier 14 such that it constitutes a feedback signal therefor. The amplified difference signal applied to the control terminal 16 of the variable gain amplifier 14 varies the gain of the amplifier until the difference signal from the comparator 40 becomes zero. Thus, it is seen that the amplitude of both the A and B signals applied to switch input terminal 23 is either increased or decreased by the variable gain amplifier 14 until the value of the B signal therein becomes unity. Therefore, the B signal and hence the denominator of the desired ratio is forced to a value of unity and thus the value of the A signal represents the value of the ratio of A over B.

The separated A signals applied to the A channel are the electronic representation of the 805 m$\mu$ wavelength radiation applied to the catheter, which radiation is equally absorbed by the oxyhemoglobin and the reduced hemoglobin and as such represents the numerator of the desired ratio. Since, however, as explained above, the values of both the numerator and denominator have been modified in amplitude such that the denominator of the ratio is unity, the value of the numerator represents the entire ratio and can therefore be indicated directly. Thus, the signals present in the A channel are suitably smoothed by the filter 34 and thereafter amplified by the channel A amplifier 35 for application to the indicating device 36. The indicating device 36 may be any of the class of well-known meters or other indicating devices, and if a continuous record is desired, a recording device may be used, such as a recording voltmeter.

Thus, it is seen that the present invention provides a direct reading spectrophotometer, which is usable as a direct reading oximeter which provides a direct indication of the percent of oxygen saturation in a fluid such as blood; and whose structure is uniquely designed to insure simplicity in operation, economy of the elements utilized, and extremely precise results.

It should be noted that the apparatus which is the subject matter of the instant invention is highly accurate because the use of information filters and optical wedge adjusting means has been entirely eliminated. Furthermore, the speed of the indication of the percent of oxygen saturation and changes therein as well as the direct availability thereof has proved to be of great value with regard to medical applications of this device.

Although the spectrophotometer apparatus according to the present invention has been disclosed in an embodiment wherein the black level between the information pulses of the multiplexed wave has not been sampled, it should be obvious that such sampling is available and readily obtainable. Thus, such sampling is considered to be an obvious modification which is well within the teachings of the instant disclosure.

While the invention has been described in connection with a specific embodiment thereof, it will be understood that many modifications will be readily apparent to one of ordinary skill in the art; and that this application is intended to cover any adaptations or variations thereof. Therefore, it is manifestly intended that this invention be only limited by the claims and the equivalents thereof.

We claim:

1. Direct reading spectrophotometer apparatus comprising:

radiation transmitting means having an optical input and an optical output;

illuminating means having an optical output for providing two discrete radiation wavelengths in a time division multiplex sequence;

means for placing said optical output of said illuminating means in light communication with said optical input of said radiation transmitting means;

light detector means, said light detector means having an optical input and an electrical output, said light detector means responsive upon exposure to said two discrete radiation wavelengths to produce first and second electrical signals in a time division multiplex sequence;

means for placing said optical input of said light detector means in light communication with said optical output of said radiation transmitting means;

switch means connected at its input to said light detector means, said switch means being responsive to the presence of said time division multiplex signals at its input to produce said first electrical signal at a first output terminal and said second electrical signal at a second output terminal;

comparator means connected to means for providing a reference signal and to said second output terminal, said comparator means responsive to the presence of said second signals to compare said second signals with said reference signal and present the difference therebetween at the comparator output;

variable amplitude control means interposed between said light detector means and said switch means, said control means being responsive to control signals applied thereto to vary the amplitude of signals passing therethrough; and means connecting the output of said comparator means to said variable amplitude control means to control the amplitude of the signals present at the output thereof, whereby said first signal produced at said first output terminal of said switch means is representative of the ratio of said first and second signals.

2. The apparatus of claim 1 wherein said variable amplitude control means comprises a variable gain amplifier having an input terminal connected to said electrical output of said light detector, an output terminal connected to the input terminal of said switch means, and a gain control terminal connected to said comparator output means in feedback configuration.

3. The apparatus of claim 1 wherein said reference signal is a unity reference voltage and said comparator comprises a difference amplifier.

4. The apparatus of claim 1 additionally comprising synchronizing means connected to said switch means and controlling the operation thereof.

5. The apparatus of claim 1 wherein said optical output of said illuminating means comprises a singular area and said optical input of said illuminating means comprises first and second input slits and a diffraction grating, said input slits and said diffraction grating having a fixed optical relationship so that selected components of the radiation which impinges on each slit will be reflected from said diffraction grating and impinge upon said singular area of said optical output of said illuminating means, said first and second input slits having a predetermined spacing therebetween which spacing is calculated to insure that said selected components of radiation from said first slit will comprise radiation of a first wavelength and said selected components of radiation from said second slit will comprise radiation of a second wavelength, different from said first wavelength.

6. The apparatus of claim 5 wherein said optical input of said illuminating means additionally comprises reflection means positioned in the light path between said input slits and said diffraction grating and further positioned in the light path between said diffraction grating and said singular area of said optical output so that any aberrations introduced by said reflection means as the radiations traverse the light path between the input slits and the diffraction grating are substantially compensated as said radiations traverse the light path between said diffraction grating and said singular area of said optical output.

7. The apparatus of claim 1 wherein said illuminating means comprises:
 first and second input slits; and
 lens means for transforming an inhomogeneity in the spatial distribution of radiation radiating toward said first and second input slits into an inhomogeneity in the angular distribution of said radiation.

8. The apparatus of claim 7 wherein the means to uniformly illuminate each slit comprises:
 a source of radiation in light communication with said first slit;
 radiation imaging means for forming an image of said source of radiation upon the energization thereof, at a location in light communication with said second slit; and
 collimating means positioned between said first and second slits and said source of radiation and the image thereof respectively, for transforming an inhomogeneity in the spatial distribution of radiation radiating toward said first and second input slits into an inhomogeneity in the angular distribution of said radiation.

9. The apparatus of claim 8 wherein chopper means are positioned between said input slits and said collimating means so that said input slits are alternately illuminated when the apparatus is energized.

10. The apparatus of claim 9 wherein said optical output of said illuminating means comprises a singular area, and said illuminating means additionally comprises a diffraction grating and reflection means; said input slits, said reflection means and said diffraction grating having a fixed optical relationship so that selected components of the radiation which impinges on each slit will be reflected from said diffraction grating and impinge upon said singular area of said optical output of said illuminating means, said first and second input slits having a predetermined spacing therebetween which spacing is calculated to insure that the selected components of radiation from said first slit will comprise radiation of a first wavelength and said selected components of radiation from said second slit will comprise radiation of a second wavelength different from said first wavelength, said reflection means positioned in the light path between said input slits and said diffraction grating and further positioned in the light path between said diffraction grating and said singular area of said optical output so that any aberrations introduced by said reflection means as the radiation traverses the path between the input slits and the diffraction grating are substantially compensated as said radiation traverses the light path between said diffraction grating and said singular area of said optical output.

11. The apparatus of claim 10 wherein:
 said variable amplitude control means comprises a variable gain amplifier having an input terminal connected to said electrical output of said light detector, an output terminal connected to the input terminal of said switch means, and a gain control terminal connected to said comparator output means in a reverse feedback configuration;
 said reference signal being a unity reference voltage and said comparator means comprising a difference amplifier; and
 indicating means connected to said first output terminal of said switch means.

References Cited

UNITED STATES PATENTS 3,194,110   7/1965   Eppig et al.

RONALD L. WIBERT, Primary Examiner

V. P. McGRAW, Assistant Examiner

U.S. Cl. X.R.

250—214, 218; 356—178